Dec. 6, 1966 R. W. ADAMS 3,289,537
ROTARY CUTTER BAR
Filed May 22, 1964 2 Sheets-Sheet 1
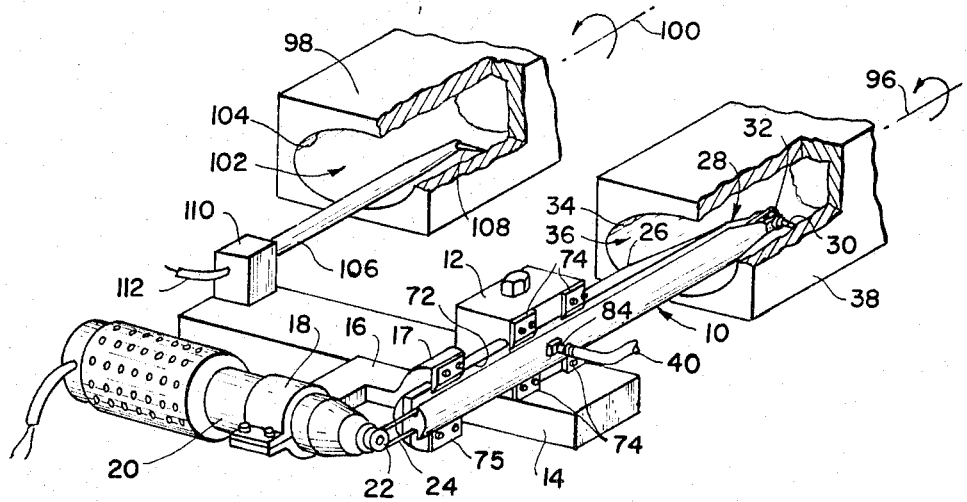
Fig.1.
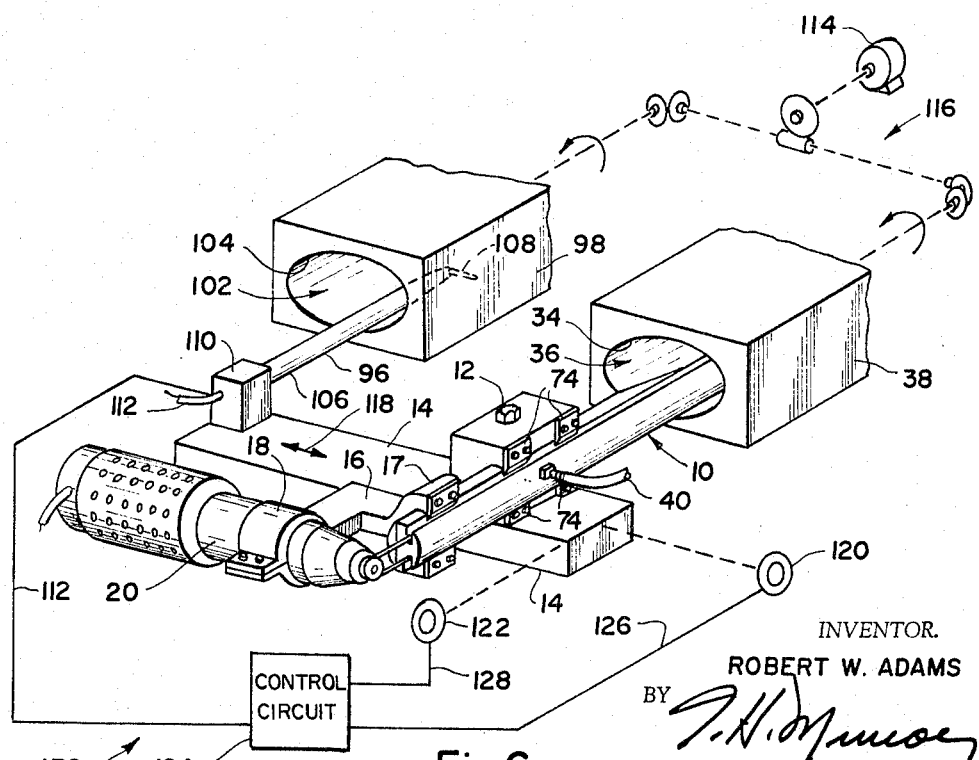
Fig.6.
INVENTOR.
ROBERT W. ADAMS
BY 
ATTORNEY

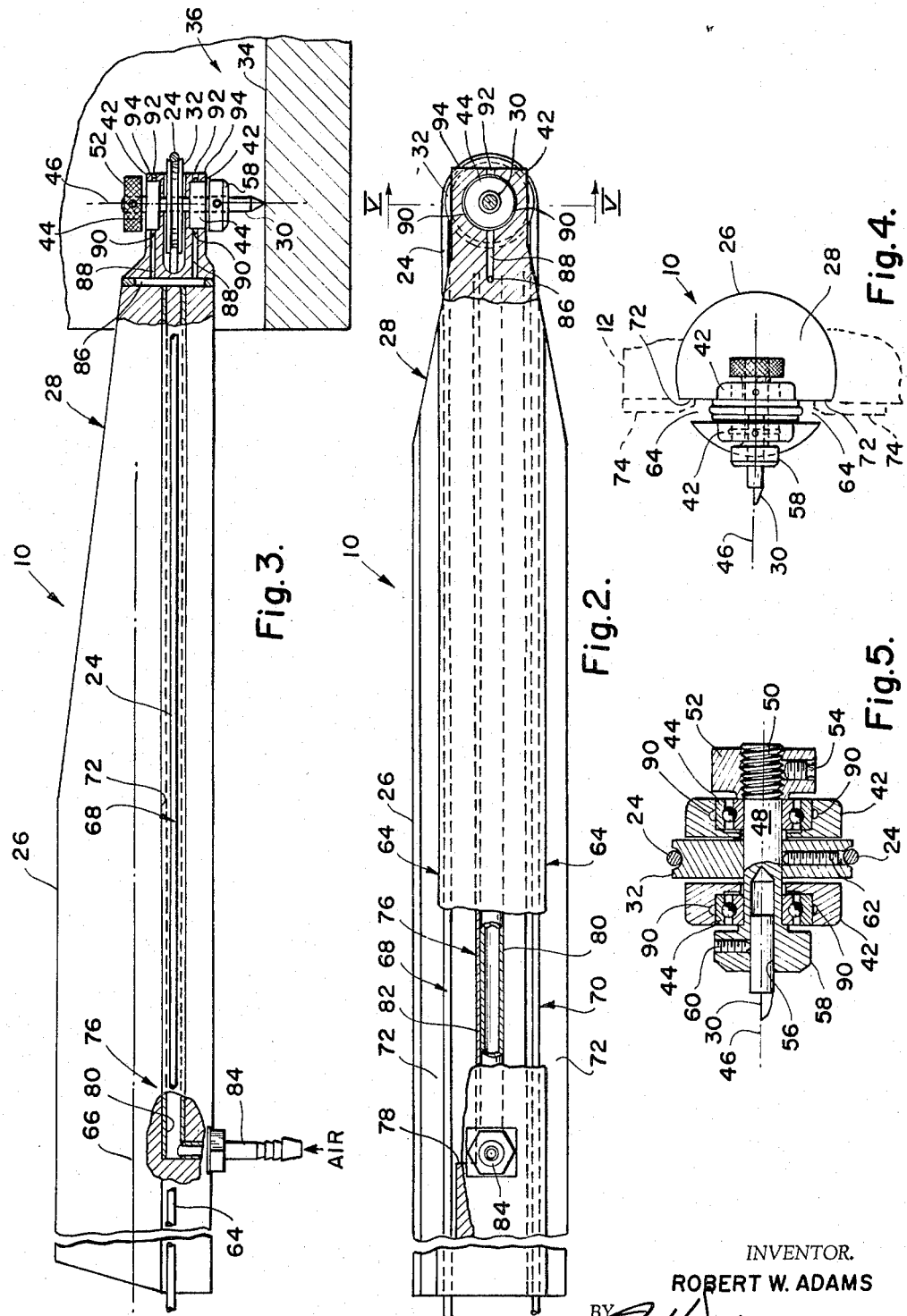

United States Patent Office 3,289,537
Patented Dec. 6, 1966

3,289,537
ROTARY CUTTER BAR
Robert W. Adams, Greensburg, Pa., assignor to Overmyer Mould Company of Pennsylvania, Greensburg, Pa., a corporation of Pennsylvania
Filed May 22, 1964, Ser. No. 369,389
8 Claims. (Cl. 90—11)

This invention relates to a cutter bar for machining interior and exterior surfaces of workpieces, and more particularly to a rotary cutter bar having a cutter bit rotatable at a high rate of speed for machining said surfaces.

Prior art apparatus are available today for machining a design on the interior surface of a hollow die mold. Such apparatus are conventional in the art and may be termed design duplicators. Such apparatus include a follower having a tracer pin engageable with the contours of a design formed in the interior surface of a master mold. A suitable carrier mechanism is provided which movably supports the follower and a cutter bar in a fixed, spaced-apart parallel relation. The cutter bar is provided with a cutter bit which is rigidly mounted to one end thereof. The cutter bit projects laterally of the cutter bar and parallel with the tracer pin. A hollow die mold is positioned around the elongated bar and in a predetermined parallel orientation with respect to the master mold. The hollow die mold and the master mold are rotated in synchronism. During the rotation of the master mold, the tracer pin is caused to move in accordance with the contours of the design. Since, the carrier mechanism supports the follower device and the elongated bar in a fixed, spaced-apart parallel relation, the cutter bit also is caused to move so that it duplicates the movement of the tracer pin. Hence, as the die mold moves past the elongated bar, the cutter bit bites into the interior surface of the die mold to reproduce the design in the die mold.

The cutter bars of these prior art apparatus have certain disadvantages which are overcome by the present rotary cutter bar. For example, in the prior art apparatus, the shape of the mold cavity, the intricacy and depth of the design being duplicated all affected the speed in which the die mold was machined. The cutter bit frequency was broken and had to be replaced. Replacement of the cutter bit was costly from the standpoint of lost operating time. Extremely intricate designs could not be reproduced.

The present rotary cutter bar may be employed for machining designs and/or contours in the exterior surface of workpieces and for machining designs and/or contours in the interior surface of hollow workpieces. Although not limited thereto, the operation of the present rotary cutter bar will be described in conjunction with certain mechanisms employed in duplicating designs on the interior surfaces of hollow die molds.

In accordance with the principles of the present invention, a rotary cutter bar is provided, comprising an elongated bar having a cutter bit projecting laterally from one end thereof. The cuttter bit is supported in journals for rotation about an axis extending perpendicularly to the longitudinal axis of the elongated bar. The cutter bit is provided with a cutting edge. When the cutter bit is rotated, the cutting edge sweeps out portions of the surface being machined. A drive motor, preferably supported at the opposite end of the elongated bar, is employed in rotating the cutter bit at a high rate of speed. For example, in one embodiment of the present rotary cutter bar, the maximum rotational speed of the cutter bit is 45,000 revolutions per minute. However, in actual use the cutter bit normally is rotated at a speed of around 40,000 revolutions per minute.

Because of the high speed of rotation of the cutter bit, some means must be provided for cooling the journals upon which the cutter bit is rotatably mounted. Accordingly, means is provided for introducing a fluid, preferably pressurized air, to the region surrounding the journals. The air serves as a cooling medium. The air preferably is flowing in turbulent conditions so that heat transfer from the journals to the air is maximized. In the present rotary cutter bar, the pressurized air in introduced into a passageway which extends longitudinally of the elongated bar, passes around and in contact with the journals, and is exhausted at the cutting end of the elongated bar. Since the cutting end is disposed within the interior of the hollow die mold, the exhausted air serves the additional function of sweeping the cuttings formed during the machining operation, out of the die mold.

The drive means employed in the present rotary cutter bar, preferably comprises a pair of pulleys around which and between which extends a driving cord. The arrangement is such that in the event the cord is broken, a new cord may be installed without the need of moving the rotary bar.

Accordingly, the primary objects of the present invention include:

To provide a cutter bar of improved design;

To provide a cutter bar having a cutter bit which is rotated at a high rate of speed thereby offering machining speeds heretofore unattainable;

To provide a cutter bar having a cutting bit which may be rotated at a high rate of speed for prolonged periods of time;

To provide a rotary cutter bar for machining the interior surface of a hollow workpiece whose machining speed is unaffected by the internal shape of the workpiece; and To provide a rotary cutter bar for machining a highly intricate design.

These and other objects and advantages of the present invention will become apparent in the following detailed description by reference to the accompanying drawings, in which:

FIGURE 1 is an isometric view of the present rotary cutter bar;

FIG. 2 is a side view of the present rotary cutter bar with portions cut away to show details;

FIG. 3 is a plan view of the present rotary cutter bar with portions cut away to show details;

FIG. 4 is an end view further illustrating the present rotary cutter bar;

FIG. 5 is a cross-sectional view, taken along line V—V of FIG. 2, illustrating the rotatable support of the cutter bit; and FIG. 6 is a schematic isometric view illustrating a design duplicator apparatus employing the present rotary cutter bar.

Referring now to FIG. 1, there is illustrated a rotary cutter bar generally designated by the numeral 10, carried by a clamping member 12 which is bolted to a carrier member schematically illustrated herein and designated by the numeral 14. The carrier member 14 along with the clamping member 12 serve to position the rotary cutter bar 10 duirng the machining operation, as will be described. Extending from one end of the rotary cutter bar 10 is a support arm 16 having a first clamping end portion 17 which secures the arm 16 to the cutter bar 10 and a second clamping end portion 18 which supports a variable speed, drive motor 20. The drive motor 20 includes a drive pulley 22 having a driving cord 24 engaged therewith and extending therefrom toward the other end of the bar 10.

The rotary cutter bar 10 comprises an elongated bar 26 having a tapered first end portion 28 to which is rotatably supported a cutter bit 30. Rotatable with the cutter bit 30 is an idler pulley 32 on which the driving cord 24 is engaged. The cutter bit 30 is positioned for engagement with the interior surface 34 of a mold cavity 36 provided in a die mold schematically illustrated herein and indicated by the number 38.

The rotary cutter bar 10 has connected thereto a supply conduit 40 which, as will be described, introduces air under pressure into an internal passageway (not visible) of the elongated bar 26. The internal passageway leads to journals (not visible) rotatably supporting the cutting bit 30. The air under pressure serves to cool the journals during high speed rotation of the cutter bit 30.

As explained above, the clamping member 12 and the carrier member 14 may comprise a mechanism which is coupled with a tracer pin for guiding the cutter bit 30 during the machining of the interior surface 34 of the mold cavity 36. In this instance, the carrier 14 will move the cutter bit 30 reciprocably in a horizontal plane in response to the contours of the design being machined in the interior surface 34. It should be understood, however, that this specific use of the present rotary cutter bar 10 is intended as illustrative of the utility thereof and that the present rotary cutter bar 10 may be employed in other machining operations.

Referring now to FIGS. 2–5, inclusive, it will be seen that the elongated bar 26 preferably is cylindrical in shape. At the extreme end of the first tapered end portion 28 there is provided a clevis-like configuration comprising a pair of spaced-apart, parallel, plate-like arms 42. Carried within each of the arms 42 is a journal means 44 which preferably comprise roller bearings. The journal means 44 are positioned to define a rotational axis 46 which extends transversely of the elongated bar 26.

As can best be seen in FIG. 5, the journal means 44 support a shaft 48 for rotation about the rotational axis 46. The shaft 48 includes a threaded end portion 50 on which is threaded a thrust collar 52 engageable with the inner race of one of the journal means 44. The thrust collar 52 is secured to the threaded end portion 50 by means of a set screw 54. In the opposite end of the shaft 48 there is provided a bore 56 which receives the cutter bit 30 and a radial flange member 58 a portion of which is engaged with the inner race of the other journal means 44. A set screw 60 is threadedly engaged in the radial flange member 58 and serves to secure the cutter bit 30 within the bore 56. Thus, the bore 56, the radial flange member 58 and the set screw 60 function as a chuck for rigidly holding the cutter bit 30 to the tapered first end portion 28 of the elongated bar 26. The idler pulley 32 is positioned between the arms 42 and is secured to the shaft 48, by means of a set screw 62, for rotation about the axis 46.

As can best be seen in FIGS. 2–4, inclusive, the elongated bar 26 is provided with a pair of generally U-shaped grooves 64 extending along the entire length thereof. The grooves 64 are offset with respect to the longitudinal axis 66 (FIG. 3) of the elongated bar 26 and are aligned with the idler pulley 32. As can be seen in FIG. 2, the grooves 64 are positioned to receive an upper reach 68 and a lower reach 70 of the driving cord 24. Each of the grooves 64 includes a wall 72. The walls 72 are disposed in a common plane and are engageable by toe plates 74, shown in dotted outline in FIG. 4. The toe plates 74 are fastened to the clamping member 12 (FIG. 1) and serve to rigidly clamp the elongated bar 26 to the clamping member 12. As can best be seen in FIG. 4, the toe plates 74 are shaped to provide free access into the grooves 64. The first clamping end portion 17 of the support arm 16 (FIG. 1) includes toe plates 75 whose shape is similar to the shape of the toe plates 74. Hence, in the event that the driving cord 24 is broken, a new driving cord may be installed without the need of releasing or removing the elongated bar 26 from the clamping member 12 or the drive motor 20. The toe plates 74 of the clamping member 12 may be released whereupon the elongated bar 26 may be moved toward or away from the die mold 38 so as to position the cutter bit at any desired point on the interior surface 34. Since the drive motor 20 is secured directly to the elongated bar 26, the bar 26 may be moved without affecting the position of the drive motor 20.

As stated above the variable speed, drive motor 20 has mounted thereon a drive pulley 22 on which the driving cord 24 is engaged. The drive motor 20 rotates the cutter bit at relatively high speeds of rotation. In one embodiment of the present rotary cutter bar 10, the maximum speed or rotation of the cutter bit is 45,000 revolutions per minute. Normally, however, the cutter bit is driven at a speed of about 40,000 revolutions per minute. This extremely high speed of rotation produces a considerable amount of heat in the journal means 44. Consequently, some means must be provided for continuously cooling the journal means 44 during the operation of the rotary cutter bar 10.

In the present invention, the preferred medium for cooling the journal means 44 is pressurized air. To convey the pressurized air to the journal means 44 in volumes sufficient to cool the journals, there is provided in the elongated bar 26, a longitudinally extending conduit means generally designated by the numeral 76. As can best be seen in FIGS. 2 and 3, the upper one of the grooves 64 is provided with an inset portion 78 which extends from a point along the length of the elongated bar 26 to a point adjacent to the arms 42. Within the inset portion 78 there is positioned a tubular member 80, preferably comprising a length of copper tubing, which is secured in place by means of a suitable quantity of an adhesive 82 such as plastic steel. A coupling member 84 extends through the elongated bar 26 into communicating relation with that end of the tubular member 80 which is remote from the arms 42. The coupling member 84 is positioned on the elongated bar 26 so as not to hinder the movement of the bar 26 with respect to the die mold 38 (FIG. 1). The supply conduit 40 (FIG. 1) preferably is provided with a coupling device (not shown) by which the supply conduit 40 may be quickly connected to or disconnected from the coupling member 84. The supply conduit 40 serves to introduce the pressurized air into the tubular member 80.

In the region of the arms 42, the elongated member 26 is provided with a transverse passageway 86 which communicates with the open end of the tubular member 80. The opposite ends of the transverse passageway 86 are sealed, as for example, by plug welding. Second passageways 88 are provided, one each in each of the arms 42. The second passageways 88 communicate at one of their ends with the transverse passageway 86 and at the other of their ends with arcuate grooves 90 extending circumferentially around the journal means 44. Each of the arcuate grooves 90 communicate with an outlet port 92 provided in the face 94 of each of the arms 44.

The overall arrangement is such that pressurized air, introduced into the coupling member 84, passes through the tubular member 80 toward the tapered first end portion 28 of the elongated bar 26, into the transverse passageway 86, through the second passageways 88, into the arcuate grooves 90 around the journals 44, and is exhausted through the outlet ports 92. It is to be noted, that as the pressurized air flows through the arcuate grooves 90 it is in contact with the outer race of the journals 44. Hence, heat transfer occurs between the outer race of the journals 44 and the flowing air. To maximize the heat transfer, the air in the arcuate grooves 90 preferably is in turbulent flow. In one specific embodiment of the rotary cutter bar 10, the air was introduced into the coupling member 84 at a pressure of 40 p.s.i. Sufficient cooling of the journals was attained. The cooling of the journal means 44 is particularly desirable in that it prolongs their useful life. In the present rotary cutter bar 10, the bearings have an average useful life of about 130 hours. It should be evident that in the absence of the cooling provided in the present rotary cutter bar, the journal means 44 would rapidly burn up and become useless.

During the machining of the interior surface 34 of the die mold 38, cuttings are produced which normally are retained within the mold cavity 36. As can be seen in FIG. 4, the air exhausted through the outlet ports 92 will flow axially into the interior of the mold cavity 36 of the die mold 38. This is particularly desirable in that the exhausted air will serve the second function of sweeping the cuttings out of the mold cavity 36. If the cuttings were permitted to build up within the mold cavity 36, they would eventually interfere with the precise machining of the interior surface 34. However, in the present invention, the build up of cuttings is prevented since the exhausted air sweeps the cuttings out of the mold cavity 36.

Although not limited thereto, the present rotary cutter bar is particularly adapted for machining the interior surface of hollow die molds. Accordingly, the operation of the rotary cutter bar now will be described in conjunction with a conventional design duplicator apparatus.

Referring now to FIG. 1, the die mold 38 is supported for rotation about its longitudinal axis 96. A master mold 98 is positioned parallel with the die mold 38 and for rotation about its longitudinal axis 100. The master mold 98 includes a mold cavity 102 having a configuration which is identical to the configuration of the mold cavity 36 in the die mold 38. A design (not shown) is provided in the interior surface 104 of the mold cavity 102. As will be described, the master mold 98 and the die mold 38 are rotated in the same direction and in synchronism.

The carrier member 14 also supports a follower bar 106 having a tracer pin 108 secured to its free end which projects laterally therefrom. The tracer pin 108 and the cutter bit 30 are parallel. The follower bar 106 extends from a transducer 110 which serves to convert pressures applied to the tip of the tracer pin 108 into electrical signals. The electrical signals are transmitted through conductor 112 to suitable control circuitry, as will be described. The follower bar 106 is inserted into the mold cavity 102 of the master die mold 98 with the tracer pin 108 engaged with the interior surface 104.

Referring to FIG. 6, the master mold 98 and the die mold 38 are rotated by means of a mold drive motor 114 through a suitable shaft and gearing arrangement schematically illustrated and designated 116. The drive motor 114 rotates the master mold 98 and the die mold 38 in synchronism, in the same direction and at a constant speed.

The carrier member 14 is supported for horizontal reciprocal motion, as indicated by the arrow 118 and is driven by means of a first carrier drive motor 120. The carrier member 14 also is supported for incremental movement toward the molds 38, 98 and is driven by a second carrier drive motor 122. A control circuit, schematically illustrated at 124, is operatively connected to the transducer 110 through conductor 112 and operatively connected to the first and second carrier drive motors 120 and 122 through conductors 126, 128, respectively. The control circuit 124 controls both the direction and speed in which the carrier member 14 is driven by the first carrier drive motor 120 in response to the signals emitted by the transducer 110. Hence, the carrier member 14, the transducer 110, the control circuit 124 and the first drive motor 120 comprise a servo system, designated generally by the numeral 130.

As the master mold 98 is rotated, its interior surface 104 will be moved past the tracer pin 108 so that the tracer pin 108 rides over the surface 104 along a circumferential line. Simultaneously, the tracer pin 108 is moved inwardly of the mold cavity by an incremental distance during each complete revolution of the master mold 98. Hence, the tracer pin 108 will engage the entire surface 104 during the machining operation.

Since the cutter bit 30 (FIG. 1) is coupled to the tracer pin 108, it will duplicate exactly the motion of the tracer pin 108. By virtue of its high speed rotation, it will rapidly cut into the interior surface 34 of the die mold 38 thereby duplicating the design formed in the master mold.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. A rotary cutter for machining the interior surface of a hollow workpiece, comprising in combination: an elongated bar having a first end insertable within said workpiece; journal means disposed in said first end of said elongated bar and positioned to define a rotational axis extending transversely of said elongated bar; a chuck supported by said journal means for rotation about said rotational axis; a cutter bit carried by said chuck, said cutter bit being rotatable with said chuck and having a tip adapted to machine the interior surface of said hollow workpiece; means carrying said elongated bar for positioning said cutter bit with respect to the surface being machined; a drive motor supported adjacent to the opposite end of said elongated bar; an idler pulley secured to and rotatable with said chuck; a drive cord extending parallel with said elongated bar for connected said drive motor in driving relation with said idler pulley; conduit means extending through said elongated bar, around said journal means for communicating a cooling fluid to said journal means; and means for introducing a cooling fluid into said conduit means.

2. A rotary cutter for machining the interior surface of a hollow workpiece, comprising in combination: an elongated bar having a first end insertable within said workpiece; journal means disposed in said first end and positioned to define a rotational axis extending transversely of said elongated bar; a chuck supported by said journal means for rotation about said rotational axis; a cutter bit carried by said chuck, said cutter bit being rotatable with said chuck and having a tip adapted to machine the interior surface of said hollow workpiece; means carrying said elongated bar for positioning said cutter bit relative to the interior surface of said hollow workpiece; drive means for rotating said cutter bit at a high rate of speed; conduit means for communicating a cooling fluid to said journal means, said conduit means including an inlet port at a point along the length of said elongated bar and an outlet port disposed at said first end of said elongated bar, said conduit means extending from said inlet port, longitudinally through said elongated bar, around said journal means and to said outlet port; and means for introducing said cooling fluid into said inlet port; said fluid being exhausted through said outlet port into the interior of said hollow workpiece whereby the cuttings produced during the machining of the interior surface are blown out from said hollow workpiece.

3. The combination of claim 2 wherein said journal means comprise roller bearings and wherein said conduit means extends around the circumference of said roller bearings whereby said cooling fluid comes into direct contact with said roller bearings.

4. A rotary cutter for machining the interior surface of a hollow workpiece, comprising in combination: an elongated bar having a tapered end insertable within said workpiece, said tapered end having a pair of parallel, spaced-apart arms extending longitudinally therefrom, bearing means, one each in each of said arms, said bearing means being positioned to define a rotational axis extending perpendicular to the central axis of said elongated bar; a chuck; a shaft connected to said chuck and supported in said bearing means; a cutter bit carried by said chuck, said cutter bit extending parallel with said rotational axis and rotatable thereabout, said cutter bit having a tip adapted to machine the interior surface of said hollow workpiece; an idler pulley secured to said shaft between said spaced-apart arms; a drive motor supported adjacent to the other end of said elongated bar including a drive pulley aligned with said idler pulley; a drive cord connecting said drive pulley with said idler pulley; said elongated bar having a pair of oppositely disposed longitudinal grooves formed therein which extend from said tapered end to said other end of said elongated bar; each reach of said drive cord being disposed within one of said longitudinal grooves; conduit means extending longitudinally through said elongated bar to said bearing means for communicating a cooling fluid to said bearing means; means for introducing said cooling fluid into said conduit means; and clamping means carrying said elongated bar for positioning said cutter bit with respect to the interior surface of said hollow workpiece.

5. The combination of claim 4 wherein said clamping means includes a plurality of toe plates each engageable with one wall of each of said grooves whereby free access is maintained into both of said grooves.

6. The combination of claim 4 including a support arm detachably secured at one end to the other end of said elongated bar and carrying said drive motor at its other end, said one end of said support arm including a plurality of toe plates each engageable with one wall of each of said grooves whereby free access is maintained into both of said grooves.

7. A rotary cutter for machining the interior surface of a hollow workpiece, comprising in combination: an elongated bar having one end insertable within said hollow workpiece; a cutter bit at said one end extending transversely of said elongated bar; means including journals supporting said cutter bit for rotation about an axis extending transversely of the longitudinal axis of said elongated bar; drive means for rotating said cutter bit at a high rate of speed; and conduit means for communicating a cooling fluid to said journals for cooling the same during high speed rotation thereof, said conduit means extending longitudinally through said elongated bar, around said journals to an exhaust port in said one end of said elongated bar.

8. The combination of claim 7 wherein said exhaust port directs said cooling fluid axially into the interior of said hollow workpiece whereby the cuttings produced during the machining of said interior surface are swept out of said hollow workpiece.

References Cited by the Examiner

UNITED STATES PATENTS

| 1,245,238 | 11/1917 | Jones | 90—171 |
| 2,387,412 | 10/1945 | Schnable | 90—11 |
| 3,098,299 | 7/1963 | Page | 32—27 |

FOREIGN PATENTS

| 1,058,118 | 11/1953 | France. |
| 902,220 | 8/1962 | Great Britain. |

WILLIAM W. DYER, Jr., *Primary Examiner.*